Patented Sept. 25, 1928.

1,685,715

UNITED STATES PATENT OFFICE.

EMIL MOLZ, OF HALLE-ON-THE-SAALE, GERMANY, ASSIGNOR TO CHEMISCHE FABRIK LUDWIG MEYER, OF MAYENCE, GERMANY.

DRY FUNGICIDE.

No Drawing. Application filed September 8, 1925, Serial No. 55,170, and in Germany September 24, 1924.

The use of a dry agent as a fungicide is the simplest way of destroying mildew on seed. The seed is simply dusted with the dry powder and the seed can be put into the soil at once. Up to the present only copper carbonate has been employed as a dry fungicide, but it has proved efficient against Tilletia on wheat and even in that case only if the sediment was very little.

I have now found that by mixing mercury-iodine compounds which are insoluble or only slightly soluble in water, for instance, mercury iodide, with fillers, like talcum, kaolin, kieselguhr and the like or with other fungicides, like copper carbonate, with or without fillers, dry fungicides are produced, which destroy fungi (mildew) on wheat even if the deposit is very strong. Against other diseases of seed, like Helminthosporium of barley, Fusarium of rye, blight of oats, the said mercury-iodine fungicides have proved very valuable.

In place of the insoluble mercury-iodine compounds I may also apply such substances which in the presence of water form mercury iodides in the soil, say mercury chloride plus potassium iodide.

The following mixtures may be considered as examples for illustrating my invention.

|    |                  | Grams. |
|----|------------------|--------|
| 1. | Talcum           | 90.7   |
|    | Mercury iodide   | 9.3    |
| 2. | Copper carbonate | 93.6   |
|    | Mercury iodide   | 6.4    |
| 3. | Kaolin           | 30.1   |
|    | Copper carbonate | 63.3   |
|    | Mercury iodide   | 6.6    |
| 4. | Talcum           | 81.5   |
|    | Mercury chloride | 15.0   |
|    | Potassium iodide | 3.5    |

I claim as my invention:—
1. A dry fungicide comprising a mixture of mercury chloride and an alkaline iodide, said chloride and iodide forming mercury iodide in the presence of the water in the soil.
2. A dry fungicide comprising a mixture of mercury chloride, an alkaline iodide, and a filler, said chloride and iodide forming mercury iodide in the presence of the water in the soil.

In testimony whereof I affix my signature.

EMIL MOLZ.